F. O. SCHLUETER.
DITCHER AND GRADER.
APPLICATION FILED JAN. 24, 1918.

1,300,299.

Patented Apr. 15, 1919.
5 SHEETS—SHEET 1.

WITNESSES

INVENTOR
F. O. Schlueter
BY
ATTORNEYS

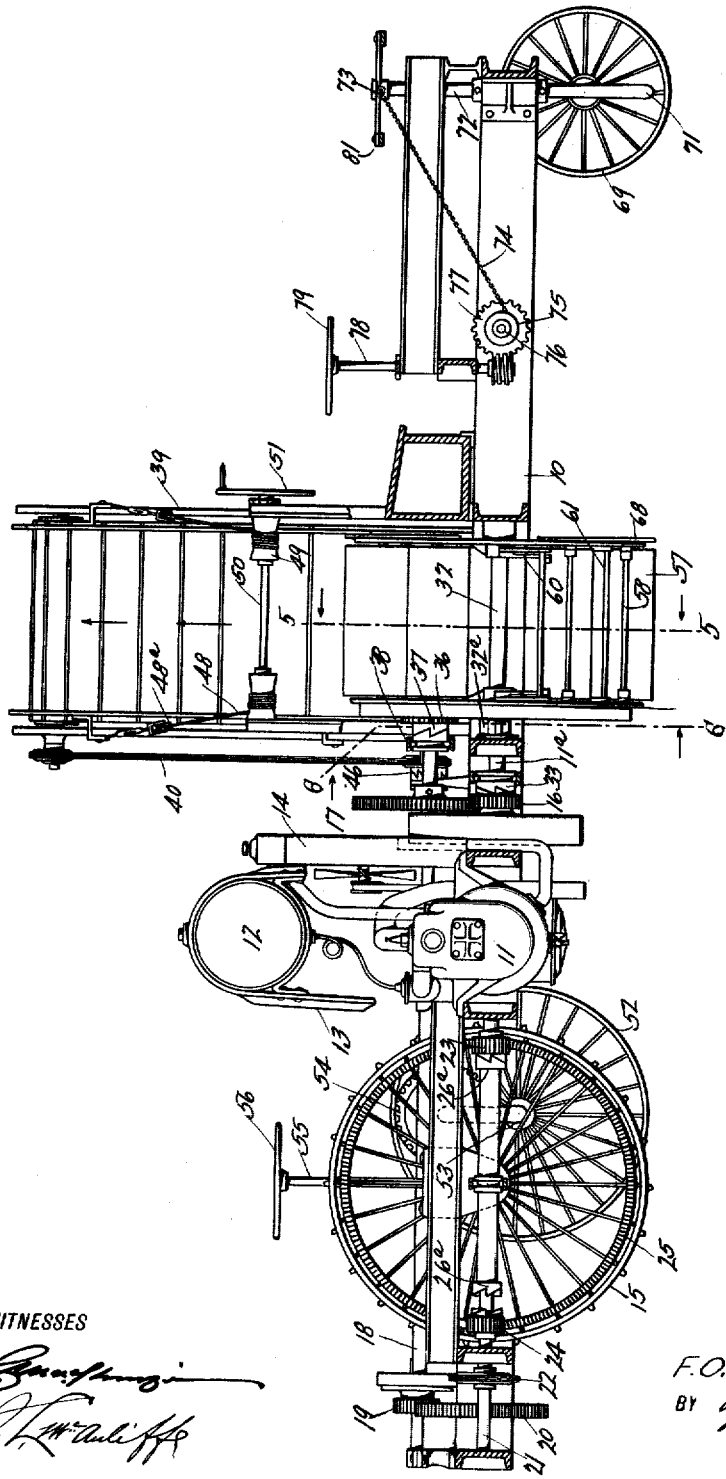

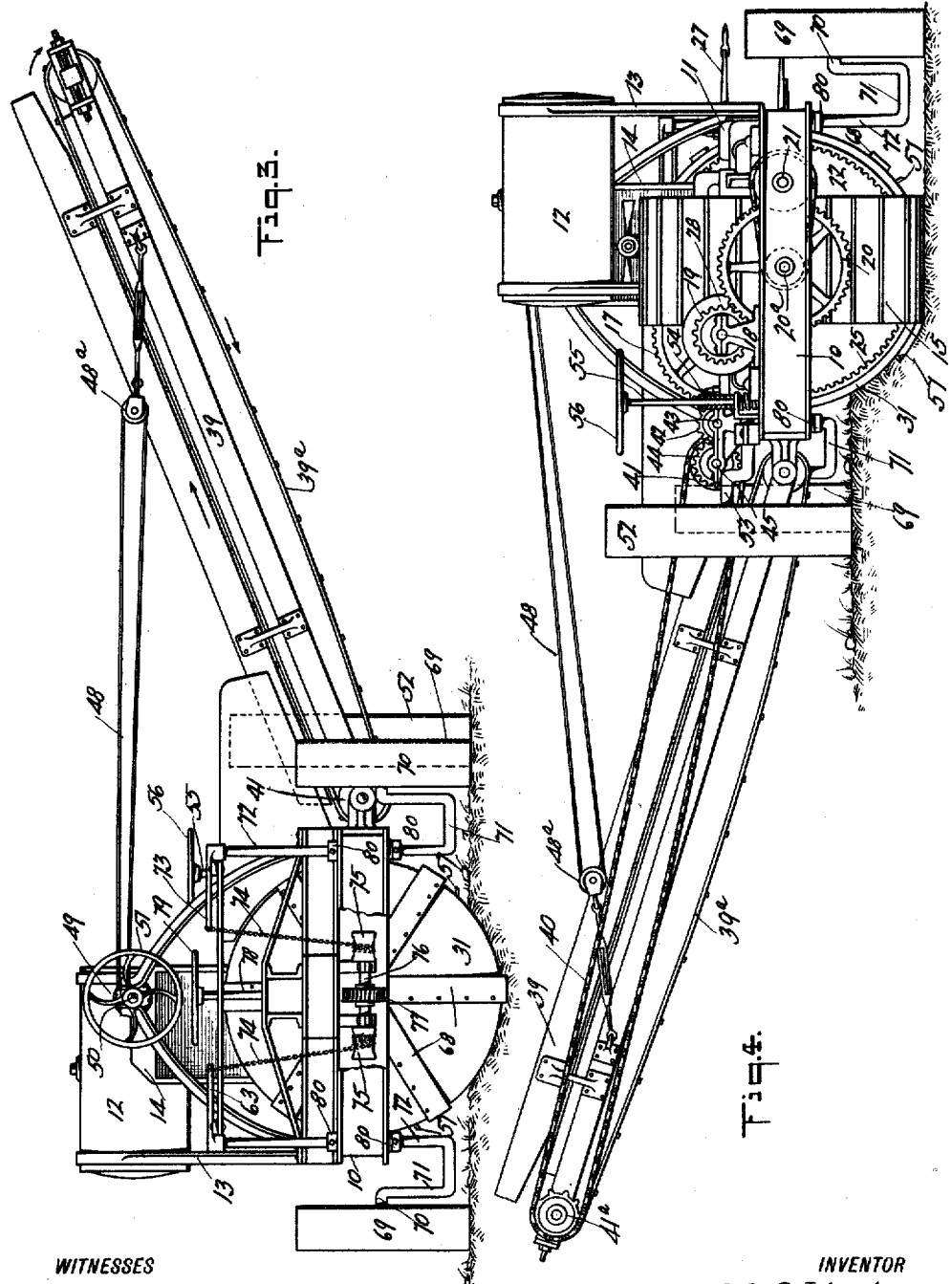

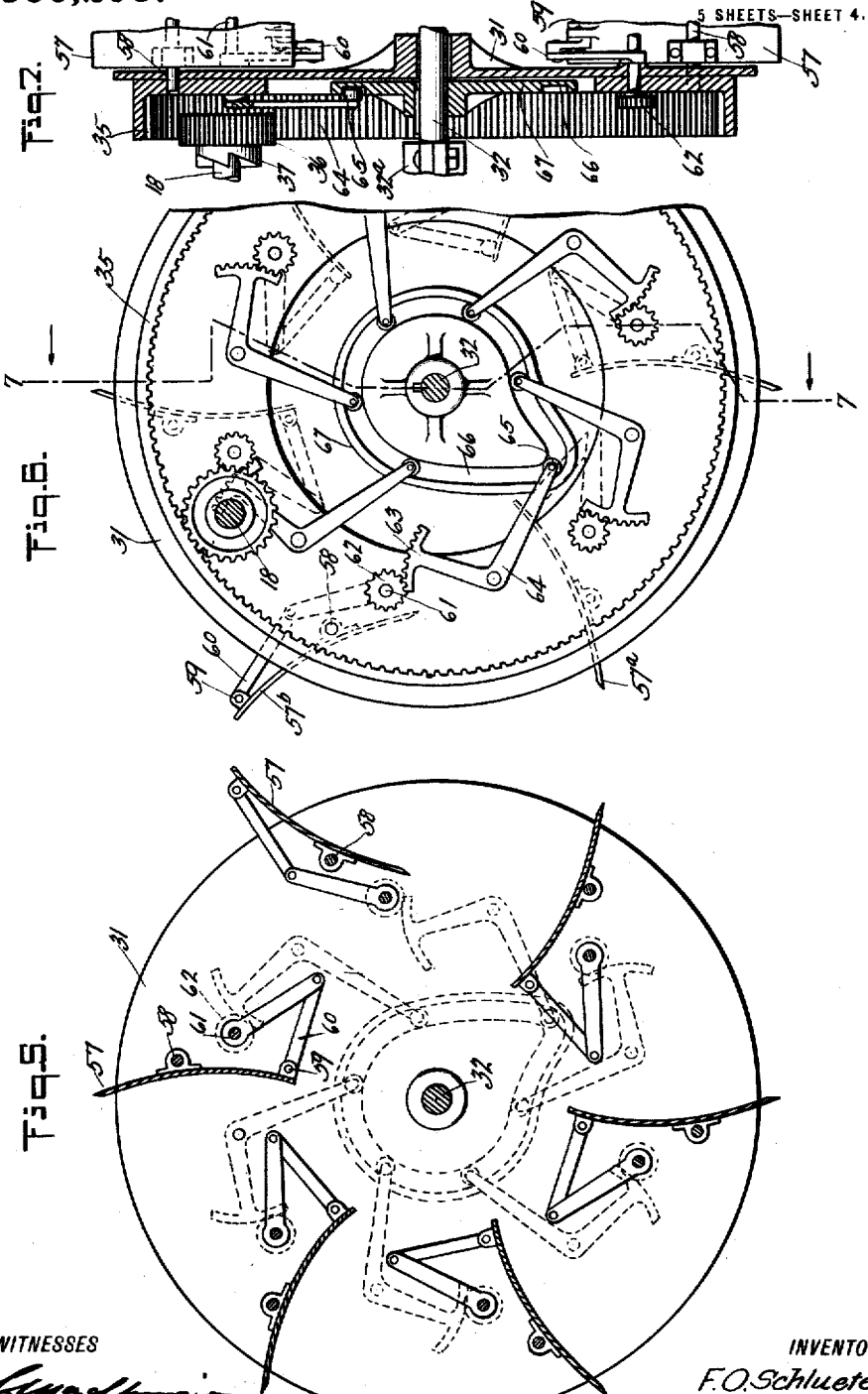

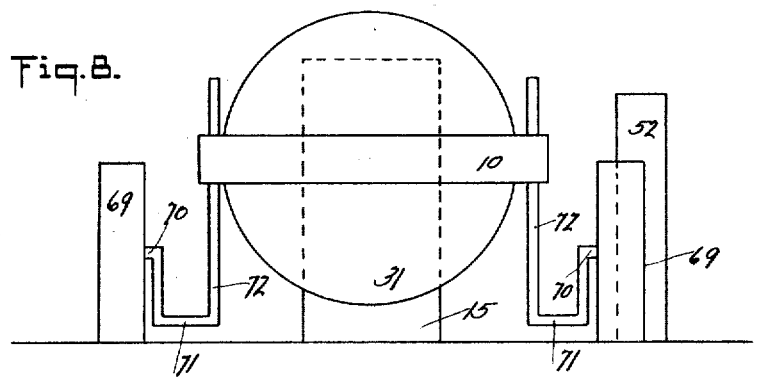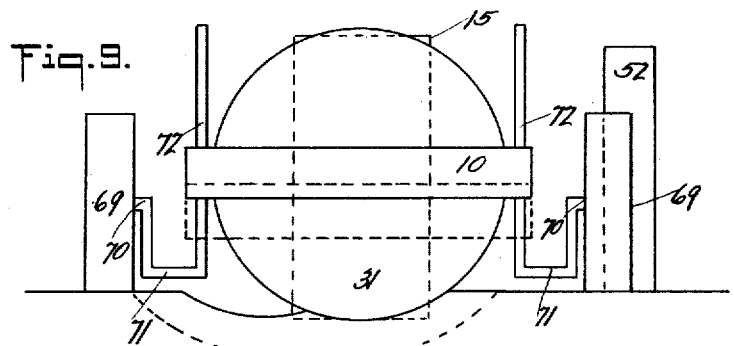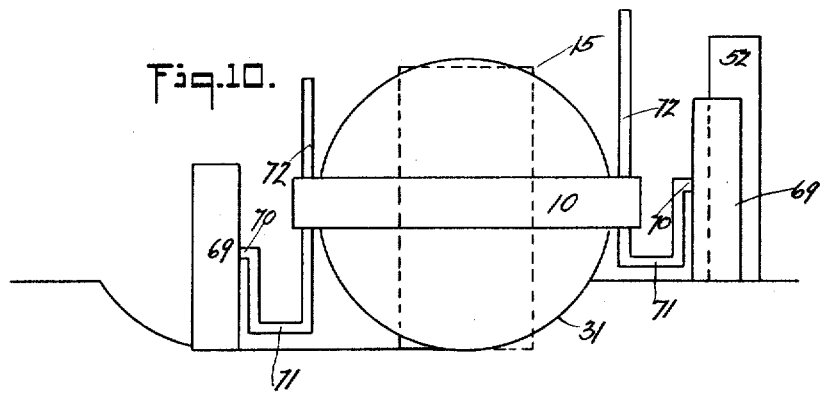

UNITED STATES PATENT OFFICE.

FRIDRICH OTTO SCHLUETER, OF SCRIBNER, NEBRASKA, ASSIGNOR OF ONE-HALF TO HENRY SCHLUETER, OF SCRIBNER, NEBRASKA.

DITCHER AND GRADER.

1,300,299.  Specification of Letters Patent.  Patented Apr. 15, 1919.

Application filed January 24, 1918.  Serial No. 213,510.

*To all whom it may concern:*

Be it known that I, FRIDRICH OTTO SCHLUETER, a citizen of the United States, and a resident of Scribner, in the county of Dodge and State of Nebraska, have invented a new and Improved Ditcher and Grader, of which the following is a full, clear, and exact description.

My invention relates to a tractor-driven machine adapted for ditching, road grading, and like work, and has for its general object to produce an efficient machine of the indicated class in which the general construction and arrangement of the main operative elements are such as to result in a well-balanced and compact structure making for facility of operation and control.

An important object also is to produce an improved rotary cutting wheel or shovel wheel operating in a novel manner to effectively cut the ground and pitch the cut material onto a conveying or elevating means, whereby to carry the material to a side of the ditch or road.

A further important object of the invention is to provide an improved arrangement of steering wheels readily adjustable for properly disposing the machine for making successive cuts in a ditch or road.

The invention also has for an object to provide the machine with improved means readily adjustable to regulate the depth of the cut.

Reference is to be had to the accompanying drawings forming a part of this specification in which similar reference characters indicate corresponding parts in all the views, it being understood that the drawings are merely illustrative of one example of the invention.

Fig. 2 is a side elevation, the frame parts being in section;

Fig. 3 is a front end view of the machine;

Fig. 4 is a rear end view;

Fig. 5 is an enlarged transverse vertical section of the shovel wheel, the section being taken on the line 5—5, Fig. 2:

Fig. 6 is an enlarged transverse vertical section on the line 6—6, Fig. 2;

Fig. 7 is a vertical section on the line 7—7, Fig. 6;

Figs. 8, 9 and 10 are diagrammatic front views of the shovel wheel and steering wheels.

Figure 1:
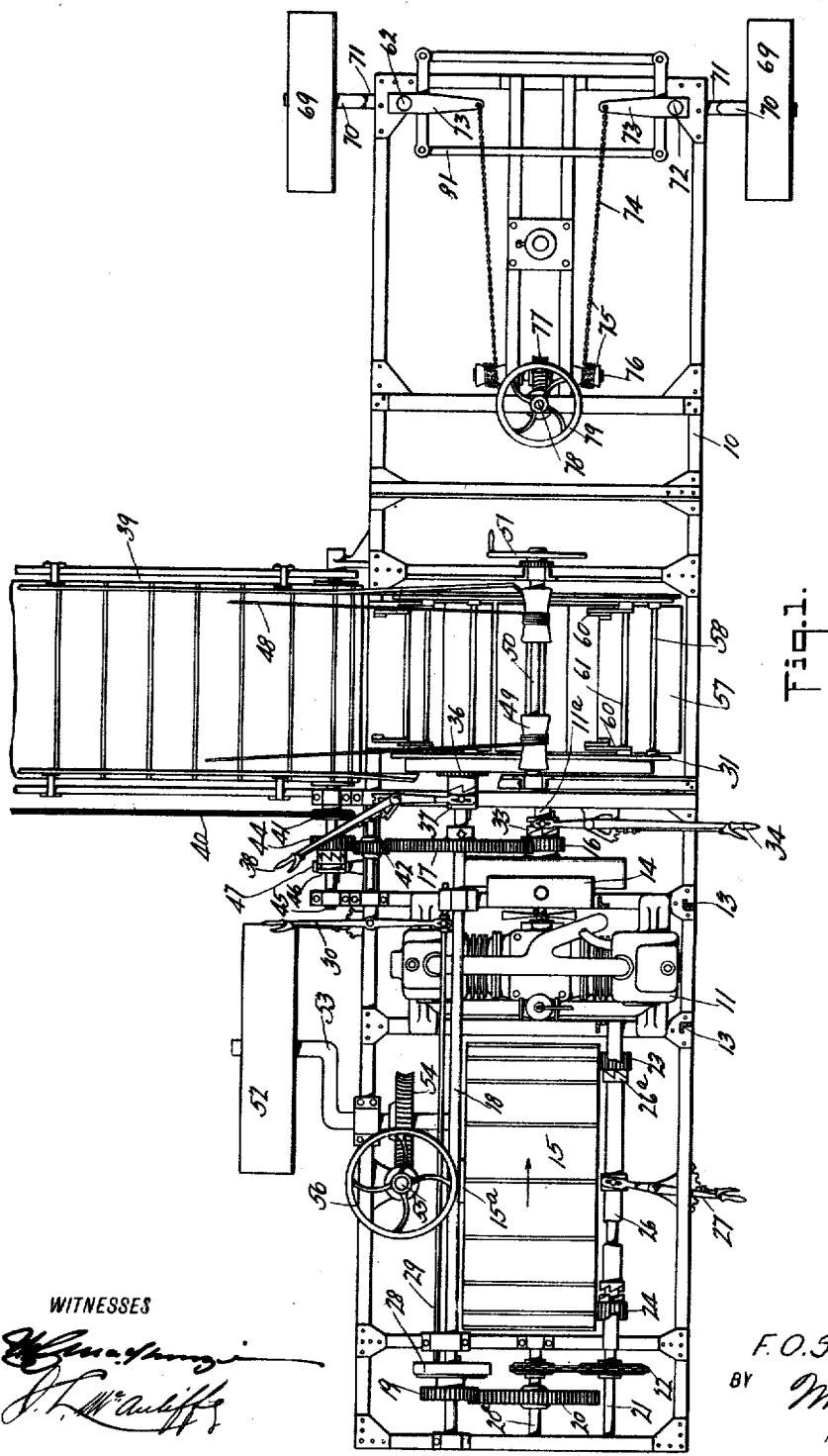
Figure 1 is a plan view of a machine embodying my invention, the fuel tank being omitted and a portion of the tank-supporting means being broken away.

In constructing a practical embodiment of my invention, a suitable frame 10 is provided in which is mounted a motor 11, here indicated as an internal combustion engine supplied with fuel from an overhead tank 12 on suitable supporting elements 13. The numeral 14 indicates a radiator.

A single bull wheel or tractor wheel 15 is centrally positioned in the frame 10 at the rear of the machine, the character 15ª indicating the axle thereof. The engine as well as various drive shafts and other elements establishing drive connection between the engine and the tractor wheel are disposed in the frame 10 about the tractor wheel, the arrangement making for compactness and for the production of a balanced structure. I have illustrated one arrangement of drive means which includes a pinion 16 loose on the engine shaft 11ª and adapted to be driven by a clutch 33 on said shaft, the numeral 34 indicating a clutch lever. The pinion 16 meshes with a gear wheel 17 on the shaft 18 extending longitudinally in the frame along one side of the tractor wheel 15, and at the rear end the shaft 18 has a pinion 19 meshing with a pinion 20 on a countershaft 20ª which has driving connection with a clutch shaft 21 disposed longitudinally of the frame at the opposite side of the tractor wheel from the shaft 18. The drive connection between the shaft 20ª and the shaft 21 may be of any approved form, there being indicated in the illustrated example a sprocket drive designated 22. On the shaft 21 are front and rear loose pinions 23, 24 meshing with an annular rack or gear wheel 25 on the tractor wheel 15. A clutch sleeve 26 is slidable on the shaft 21 relatively to the pinions 23, 24 and said sleeve and pinions have mating clutch elements as indicated at 26ª. The sleeve is shifted by a suitable clutch lever 27 for causing either pinion 23, 24 to be driven by the shaft 21 through the sleeve 26 for turning the tractor wheel 15 forwardly or back. The numeral 28 indicates conventionally a disk clutch on the shaft 18 so that the drive connection between the engine and the shaft 21 may be established or disestablished independently of the directional clutch 26. The clutch 28 is controlled by a shift rod 29 movable by a lever 30.

My improved shovel wheel designated generally by the numeral 31 and hereinafter particularly described, turns about an axis disposed longitudinally of the machine, that is to say, the wheel turns in a plane transverse to the direction of travel of the machine. In the illustrated example the shovel wheel 31 turns about a fixed shaft 32 supported in any suitable manner in the frame 10, there being indicated a supporting clamp bracket 32$^a$ at that end of the shaft 32 adjacent to the engine shaft 11$^a$. The drive means for the shovel wheel 31 in the illustrated example includes a gear wheel or annular rack in fixed relation to said wheel meshing with which rack in a pinion 36 loose on the shaft 18 and controlled by a clutch 37, including clutch elements on the pinion 36 and adjacent to the same on the shaft 18, the clutch being controlled by a lever 38, so that the throwing of the lever establishes driving connection between the shaft 18 and the pinion 36 or disestablishes the driving connection. The shovel wheel delivers the material to a transversely disposed elevator 39 which may be of a type as shown, having an endless apron 39$^a$. A sprocket driven chain 40 drives the apron, the drive sprocket for the chain being indicated at 41 and an idler sprocket at 41$^a$ (Fig. 4), on the shaft of which latter sprocket is a drive drum for the apron 39$^a$. Any suitable drive connection is established between any of the driven shafts and the elevator drive, there being illustrated as one example, a pinion 42 in mesh with the gear wheel 17, said pinion being on a shaft 43 and meshing in turn with a pinion 44 on the shaft 45 carrying the drive sprocket 41. To control the drive connection any clutch 46 may be provided on the shaft 45 and controlled by a lever 47. The elevator 39 is adapted to be raised and lowered by a tackle including cables 48 run through pulley blocks 48$^a$ secured to the elevator near the upper end and winding on drums 49 on the drum shaft 50 which is manually operable by a handwheel 51 or the like.

To regulate the depth of the cut, a depth gage wheel 52 is provided and mounted loosely on a crank axle 53 turning in suitable bearings on the frame 10 and having a worm wheel 54 thereon driven by a worm shaft 55 having a hand wheel 56 at the top.

The shovel wheel 31 as best illustrated in Figs. 5 to 7, carries an annular series of shovels 57 preferably curved in cross section. Each shovel is rockable on trunnions formed, for example, by the projecting ends of shafts or rods 58 secured to the shovel and having bearings in the wheel 31. To each shovel is connected as at 59 one arm of a toggle lever 60; the other arm of the lever is secured to a shaft 61 rockable in the wheel 31 and carrying a pinion 62 meshing with which is a toothed sector 63 on one arm of a bellcrank lever 64 carried by the shovel wheel. The other arm of said bellcrank lever 64 carries a roller 65 which is adapted to travel in the groove 66 of a cam 67 made fast to a portion of the fixed structure, the cam in the present instance being keyed to the fixed shaft 32.

By the described arrangement as the wheel 31 is revolved by the pinion 36, meshing with the rack 35, the series of shovels 37 are carried about the axis of the wheel, thereby causing the several rollers 65 to traverse the cam groove 66. The cam groove 66 is so shaped that for approximately half of a revolution the roller 65 will travel in a semi-circular path, the center of which is the center of the shaft 32 so that there will be no movement or little movement imparted to the bellcranks 64, thereby maintaining an unchanging relation between the sectors 63 and pinions 62, to carry the shovels downwardly at a proper angle for cutting and scraping as a shovel approaches a horizontal position at the front of the wheel and descends to travel forwardly at the under side of the wheel. As a shovel approaches the discharge side of the wheel, the roller 65 of the bellcrank 64 pertaining to that particular shovel, leaves the semi-circular portion of the cam groove 66 and traverses a portion of the cam groove disposed at an angle to cause a rocking of the bellcrank. Thus, the shovel is maintained in normal position for scraping and carrying until the apex of the angle of the cam groove is reached by the roller 65 and the shovel has reached the position indicated by the character 57$^a$, Fig. 6, whereupon there is a sudden tilting and pitching action given the shovel between the travel of the wheel from 57$^a$ to the position 57$^b$, the shovel immediately moving back to normal. The movement of the shovel 57 is very like the sudden jerk resulting from movement of an operating lever backward and forward, but is more quickly accomplished than can be done by a manually operated lever. No time is lost between the forward movement to dump and the return of the shovel to normal. It is found in actual practice that the sudden dumping movement of the shovel tends to clean, so that the shovels will "scour" in the heaviest or "gumbo" soil.

The numeral 68 indicates fixed cutters on the front side of the wheel 31, said cutters being approximately radial or otherwise angularly positioned on the closed front of the wheel to effectively cut into the ground. The cutters 68 therefore on the advancing face of the shovel wheel contribute a material cutting action to that of the shovels 31 which latter in their cutting positions project radially to the necessary extent beyond the periphery of the face or cheek to cut the material as the wheel is advanced in the forward travel of the machine and carry the material upwardly about the periphery of the wheel to the discharging point. The knives 68 only make an incision just in advance of the shovel. They do not take up any of the soil and they save the shovel from tearing the soil away. The action is analogous to that of a colter on a plow beam which makes a cut between the soil turned over by the plow and the adjacent unplowed land. There is no place for clogging of the soil and in fact the knives prevent the clogging of the shovel as is demonstrated by the use of the machine in actual practice. The rotation of the shovel wheel in a transverse plane makes for compactness and for directness in disposing of the material discharged by the shovel wheel and the arrangement of cutters enables the machine to cut as it advances. The shovel wheel, it will be seen, is distinguished from various machines of the type in which the cut material passes axially through the wheel to be discharged and from that type in which the wheel is advanced edgewise with the forward travel of the machine.

Since the shovel wheel 31 turns about a fixed axis in the frame I employ steering wheels adjustable to permit the bodily lowering of the frame as the cut deepens and widens. The steering wheels 69 at each side are independent, each being mounted on the spindle 70 of a bent axle 71 at a side of which rises posts 72 carrying suitable steering means permitting the vertical adjustment of the axles, there being illustrated as one example steering arms 73 on the posts 72, from which arms chains 74 run to drums 75 on a shaft 76 having a worm 77 operated by the worm shaft or steering post 78, carrying the steering wheel 79, it being understood that the steering post may in practice be disposed at the proper angle or inclination, it being conventionally shown here as vertical for convenience of illustration. The posts 72 of the respective axles are held in a given adjustment by any suitable means such as collars 80 thereon above and below the frame 10. The steering arms 73 may be connected also in practice by a bellcrank 81.

The diagram of Fig. 8 illustrates the adjustment of the steering wheels and their posts 72 when not working as, for example, when transporting the machine, Fig. 9 illustrating the corresponding adjustment of the two steering wheels when making the first cut. Fig. 10 illustrates the adjustment of one wheel to run in the cut while the steering wheel at the opposite side runs on the level. It will be observed that the drop 71 in the axle is such as to permit the spindle 70 to be in the plane or even above the general plane of the frame 10, thereby providing for a very wide range of adjustment to suit the varying working conditions as the cut is deepened and widened.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a machine of the class described, a wheel, a series of shovels separately rockable thereon, a series of toggle levers connected with the respective shovels, means on the wheel to actuate the levers, and co-acting means on a relatively fixed part of the machine adapted to operate said actuating means by the relative turning of the wheel to dispose the shovels for cutting and for giving a discharging movement to the shovels during a revolution of the wheel.

2. In a machine of the class described, a wheel, a series of shovels separately rockable thereon, a series of toggle levers connected with the respective shovels, a second series of levers to actuate the toggle levers, and a relatively fixed cam with which the second series of levers engage and adapted to rock the latter levers to thereby cause the toggle levers to shift the shovels for cutting, and for giving a discharging movement to the shovels during the revolution of the wheel.

3. In a machine of the class described, a wheel, a series of shovels separately rockable thereon, a series of toggle levers connected with the respective shovels, pinions, the turning of which actuates said toggle levers, a second series of levers, toothed segments on the second series of levers and meshing with said pinions, and a relatively fixed cam with which the levers of the second series engage for actuating said levers by the turning of the wheel relatively to said cam.

FRIDRICH OTTO SCHLUETER.

Copies of this patent may be obtained for five cents each, by addressing the "Commissioner of Patents, Washington, D. C."